United States Patent [19]
Berli

[11] Patent Number: 5,589,670
[45] Date of Patent: Dec. 31, 1996

[54] WEIGHING APPARATUS AND METHOD USING VARIABLE KEY BAR MEANS

[75] Inventor: Urs Berli, Bauma, Switzerland

[73] Assignee: Mettler-Toledo AG, Greifensee, Switzerland

[21] Appl. No.: 185,259

[22] Filed: Jan. 24, 1994

[30] Foreign Application Priority Data

Feb. 26, 1993 [CH] Switzerland ............... 589/93

[51] Int. Cl.⁶ .................................. G01G 19/22
[52] U.S. Cl. ................... 177/25.13; 177/25.16; 364/567; 364/709.14
[58] Field of Search ............... 177/25.13, 25.14, 177/25.15, 25.16; 364/567, 466, 709.14, 709.15

[56] References Cited

U.S. PATENT DOCUMENTS

| 4,814,995 | 3/1989 | Daniels, Jr. ............ 364/464.02 |
| 4,823,311 | 4/1989 | Hunter et al. .......... 364/709.14 X |
| 4,862,401 | 8/1989 | Kubli et al. ........... 177/25.11 X |
| 5,020,012 | 5/1991 | Stockberger et al. .... 364/709.14 X |
| 5,024,282 | 6/1991 | Raikes et al. ............ 177/25.15 |
| 5,084,832 | 1/1992 | Yamada et al. .......... 364/567 |
| 5,124,940 | 6/1992 | Lapeyre ................ 364/709.15 X |
| 5,181,029 | 1/1993 | Kim .................... 364/709.14 X |
| 5,258,748 | 11/1993 | Jones ................. 364/709.14 X |
| 5,307,281 | 4/1994 | Wollmann ............... 177/25.15 |
| 5,442,146 | 8/1995 | Bell et al. ............. 177/210 FP |

FOREIGN PATENT DOCUMENTS

| 3213015 | 10/1983 | Germany . |
| 3638210 | 5/1988 | Germany . |
| 3942311 | 6/1991 | Germany . |
| WO8800371 | 1/1988 | WIPO . |

*Primary Examiner*—Michael L. Gellner
*Assistant Examiner*—Randy W. Gibson
*Attorney, Agent, or Firm*—Laubscher & Laubscher

[57] ABSTRACT

A weighing scale includes a display, and a keyboard having a single bar-type key for selecting weighing programs or parameter "tree" configurations as displayed on the display of the weighing scale. The bar-type key has a plurality of longitudinally-spaced operating portions corresponding with the various operations indicated on the display, respectively.

5 Claims, 3 Drawing Sheets

WEIGHING APPARATUS AND METHOD USING VARIABLE KEY BAR MEANS

SPECIFICATION

1. Statement of the Invention

A weighing apparatus and method are disclosed, including a display and simplified keyboard means for selecting one of a plurality of weighing programs, and for reconfiguring the program parameters, as desired. The electronic weighing scale is provided with a measurement cell, a digital signal processing unit for processing and displaying different weighing programs, a display field for the alphanumerical display of the measurement values and measurement parameters, and a keyboard for the electronic zero setting of the display as well as for selecting and configuring at least one of a plurality of weighing programs.

2. Brief Description of the Prior Art

It has been common practice in the more recent electronic scales to provide an alphanumerical display field for the display of the weighing result as well as for the display of additional functions. Such a scale is known from German Patent No. DE-A1-36-38-210, which scale includes a digital signal processing unit that contains several programs, as well as a display field, and a tare key for the electronic zero-setting of the display. The tare key is subdivided into several sections, and each section is supported on a separate switching element, so that with software control, either all of the switching elements trigger the same function (for example, taring), or so that each switching element triggers a different function. Thus the tare key is available for simple weighing programs as a wide key that can be operated in any particular place. In other words, the basic concept of this German patent was, in the course of simple operations, to use the key that is usually subdivided into sections as a tare key for its entire width. Consequently, an additional key is needed to select another weighing program. After the activation of this additional switchover key, the selection parameters of the program, selected with the help of the additional key, appear over the tare key. Using the now subdivided tare key, one can activate the individual program points.

The German patent No. DE-A11-39-42-311, relates to an operating device for electronic equipment with an alphanumerical display field that is subdivided into four windows, and with keys or soft keys fixedly arranged around the display field. Each of the four menu windows has associated with it an identical number of keys that form two columns and two lines. By means of this arrangement, it is possible to display the lettering for the various keys in the immediate vicinity of those keys.

The present invention was developed to provide an improved weighing method and apparatus by means of which all weighing programs can be selected in a simple manner, and furthermore they can be configured as desired. Thus, the scale has a keyboard and a display field that will facilitate a simple selection of the weighing programs and the configuration of the system functions.

SUMMARY OF THE INVENTION

Accordingly, a primary object of the present invention is to provide an improved weighing apparatus and method in which the selection of basic operations and the configuration of the parameters of the weighing programs is accomplished by means of a key arranged adjacent the display field and including variable switching portions that in each case correspond with the operations indicated in the display portions. The weighing scale includes a keyboard with at least two keys, a first key being intended for tare or zero-setting, and at least one second key of the bar-shaped pressure-sensor type subdivided longitudinally in the direction of the X-coordinate into individual switching sections of narrow width. By the use of a bar-shaped key that is subdivided as desired over the entire length, plus a display field lying immediately above the key, it is possible to display the various scale programs and parameter configuration possibilities in the display field and to call them up directly by touching the key portion lying immediately adjacent the display.

According to another object of the invention, the free arrangement of the display in the display field as regards the length of the display program or the parameter and free subdividability of the key produces the advantage that, in each case, only just one of the number of "keys" corresponding with the display programs or parameters is made available to the operator, and accordingly the display field will not be confused by the presence of other, unnecessary data. Consequently, the operator in working this system, need not seek the correct key from among a large number of keys; instead, it is possible to use the entire section of a key below the mode indicated in the display field as activation section. It is frequently the case, therefore, that the key is ready only for one or two parameters in which case the activation section can be very long. When seven, eight, or more displays are provided in the display field (for example, in case of alphanumerical input), then the key is subdivided into a correspondingly large number of "key sections." The large number of key sections, for example, occurs during parameter configuration, but when a weighing operation is performed by auxiliary personnel, only two or three key sections are generally displayed. Those sections of the keys over which no display appears in the display field will not trigger any weighing or configuration function even when they are touched; Thus, they are neutralized against user operation.

BRIEF DESCRIPTION OF THE DRAWINGS

Other objects and advantages of the invention will become apparent from a study of the following specification, when viewed in the light of the accompanying drawings in which.

DETAILED DESCRIPTION

Figure 1:
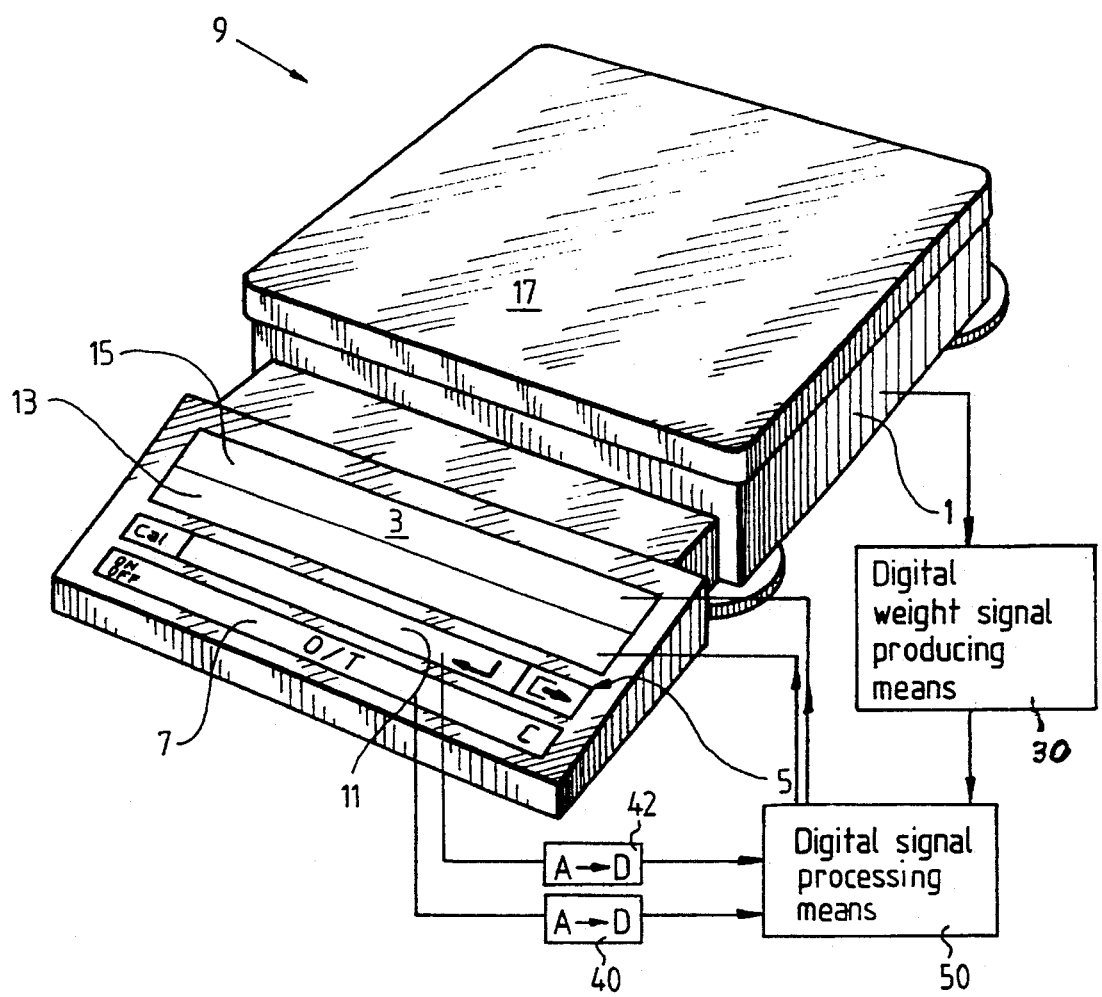
FIG. 1 is a perspective front view of the weighing apparatus of the present invention, illustrating schematically the electrical system of the invention.
Figure 2:
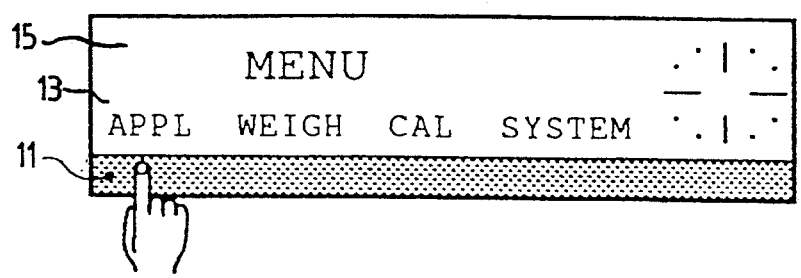
FIG. 2 is a detailed view of the display field with the main menu for starting program selection, and the bar-shaped key below it.

Referring first more particularly to FIG. 1, the scale housing 1 includes an alphanumerical display field 3 and a keyboard field having two bar-shaped keys 7 and 11. Display field 3 is subdivided into two linear parts 13 and 15. In place of two linear parts, of course, a larger number of lines or fully-graphic illustrations could be provided that also permit the display of pictrograms. A flat weighing pan 17 is movably connected with the housing base, although alternatively the weighing pan could be constructed in a windscreen housing.

The apparatus is activated by either the depression of a key and the overcoming of the mechanical resistance, or by the touching of a key that is in the form of a softkey, or a touchpad or touchpanel. Assume now that at least one key 11 is in the form of a softkey or touchpad, which key is subdivided into many small sections. In the example shown, the X-coordinate is determined in a manner similar to a potentiometer via a resistance layer that is applied on a switching foil. The resolution of the X-coordinate depends on the equality of the resistance layer and the analysis electronics. For example, it can be a maximum of about 0.5 mm,—i.e., when key 11 is touched, the analysis electronics recognizes the point of contact with a resolution in the direction of the X-coordinate amounting to at least 0.5 mm. The section having the greatest surface pressure, i.e., the middle of the finger, is recognized as the "point" of contact. The value determined for the X-coordinate is matched up with a function that lights up above the contact point in display field 13. As an alternative to the locally separated display and key fields, a transparent key is used under which the displays will appear.

As shown schematically in FIG. 1, the analog signals produced by either key 7 or key 11 are converted in a conventional manner into digital signals by means of analog to digital converters 40 and 42, respectively. Digital signal processing means 50 are provided which include, in a known manner, a memory, and a microprocessor that operates in accordance with respectively stored programs. The digital signal processing means 50, on the one hand, processes the weight signals furnished by the digital weight signal producing means 30 in accordance with selected parameters, and cause the weighing result to be displayed on display 15. On the other hand, they cause selected parameters to be shown on display 13.

EXAMPLE 1

The main menu in display field 13 is called up for the purpose of selecting and configuring a program after the scale has been turned on by activating the "ON" key that can be a part of the tare key, and by activating the MENU key 11. The following data will then appear:

APPL (application), WEIGH (weight), CAL (calibration), SYST (system).

The ENTER and PRINTING command functions can be assigned to separate keys (FIG. 1), or can also be displayed in display field 13 for activation via key 11.

Figure 3:
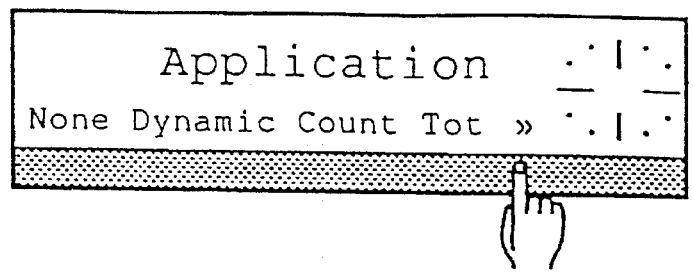
FIG. 3 illustrates the display field after selection APPL (application) in the main menu.
Figure 4:
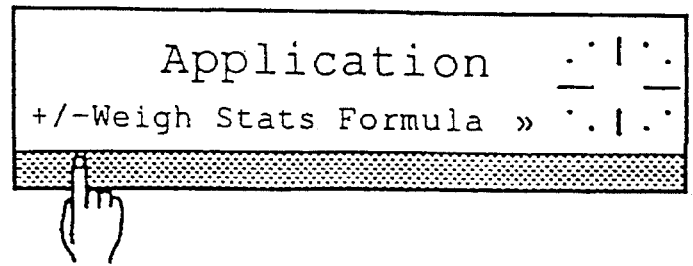
FIG. 4 illustrates the display field after selection APPL (application) in the main menu, illustration of parameters not visible in FIG. 3 after activation of >>.
Figure 5:
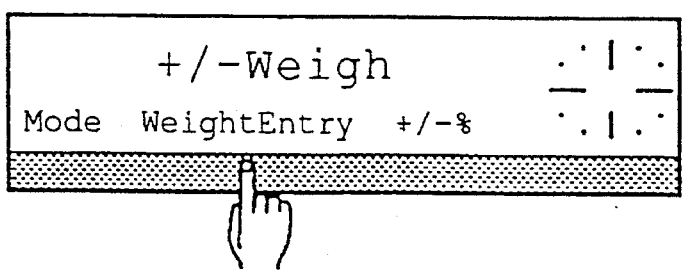
FIG. 5 shows the display field after selection +/− WEIGHT.
Figure 6:
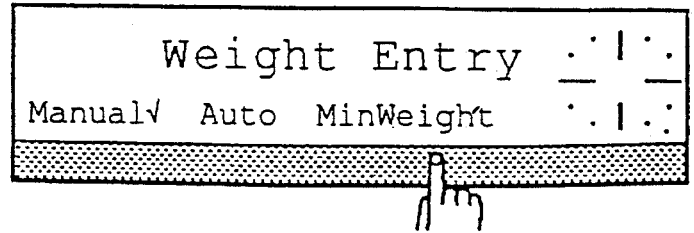
FIG. 6 shows the display field after selection WEIGHT/ ENTRY.
Figure 7:
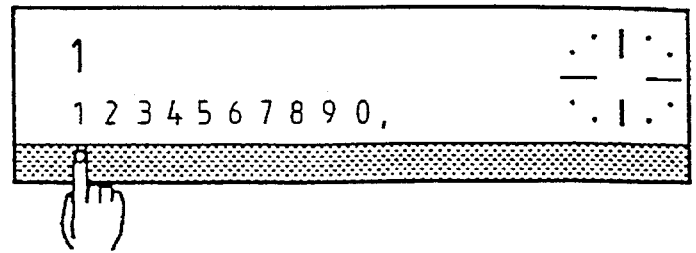
FIG. 7 shows the display field after selection MINI-WEIGHT with the number of digits from 0 to 9 with selection of digit 1.
Figure 8:
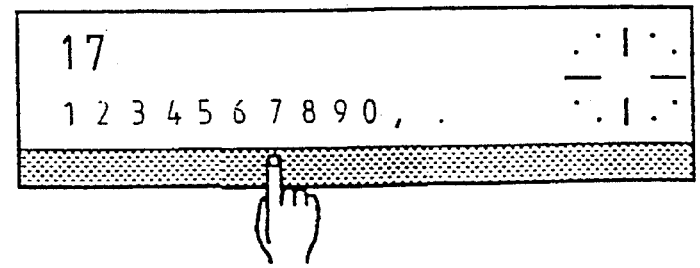
FIG. 8 shows the display field after selection of a first number "17" in the upper line.

The scale electronics respond to the touching of key 11 in the region directly below APPL as the command to have the APPL menu part displayed in an enlarged fashion and to have it completely written out on display field 15. The subfunctions within the APPL function (FIG. 3) now show up in the display line (display field 13). The functions that are possible in the basic operation APPL are illustrated arranged next to each other and above key 11 and can be selected by activating the key, i.e., by touching the portion of the key below the desired function. The arrangement of the displays here is now subject to any fixed matchup as regards the X-coordinate; it can be adapted to the requirements as regards the space need of the data in the display field. If there is insufficient space for all of the functions to find room next to each other in the display field, this is indicated by the scroll symbol >>. Touching key 11 below >> will cause additional functions to appear in display field 13 (FIG. 4). After marking, for example, of +/− WEIGH, the subfunctions of the function +/− WEIGHT will be displayed in display field 13 (FIG. 5). Next, within these functions, one could, for example, select the function WEIGHT ENTRY and it could be made visible (FIG. 6). Finally, the function MINWEIGHT can be called up in the APPL function that has a tree structure; in display field 13, again, one will find arranged the numbers [digits] "1 2 3 4 5 6 7 8 9 0" as well as punctuation marks >>to and the like, which, when assembled into a multi-digit number yield a desired minimum weighing value. Any necessary decimal positions can also be inserted by means of key 11.

By activating the MENU key for a longer time, the value that was inputted is stored and only the selected weighing parameters and functions appear in display field 13. The key section below the display field 13 is inactive during weighing. The weight display now takes place numerically in the upper display field 15 and, behind it, there is displayed the unit of weight (kg. g. oz, etc.). An alternate unit of mass can be displayed and selected by activating key 11, provided it has first been determined in the SYSTEM Mode.

EXAMPLE 2

Figure 9:
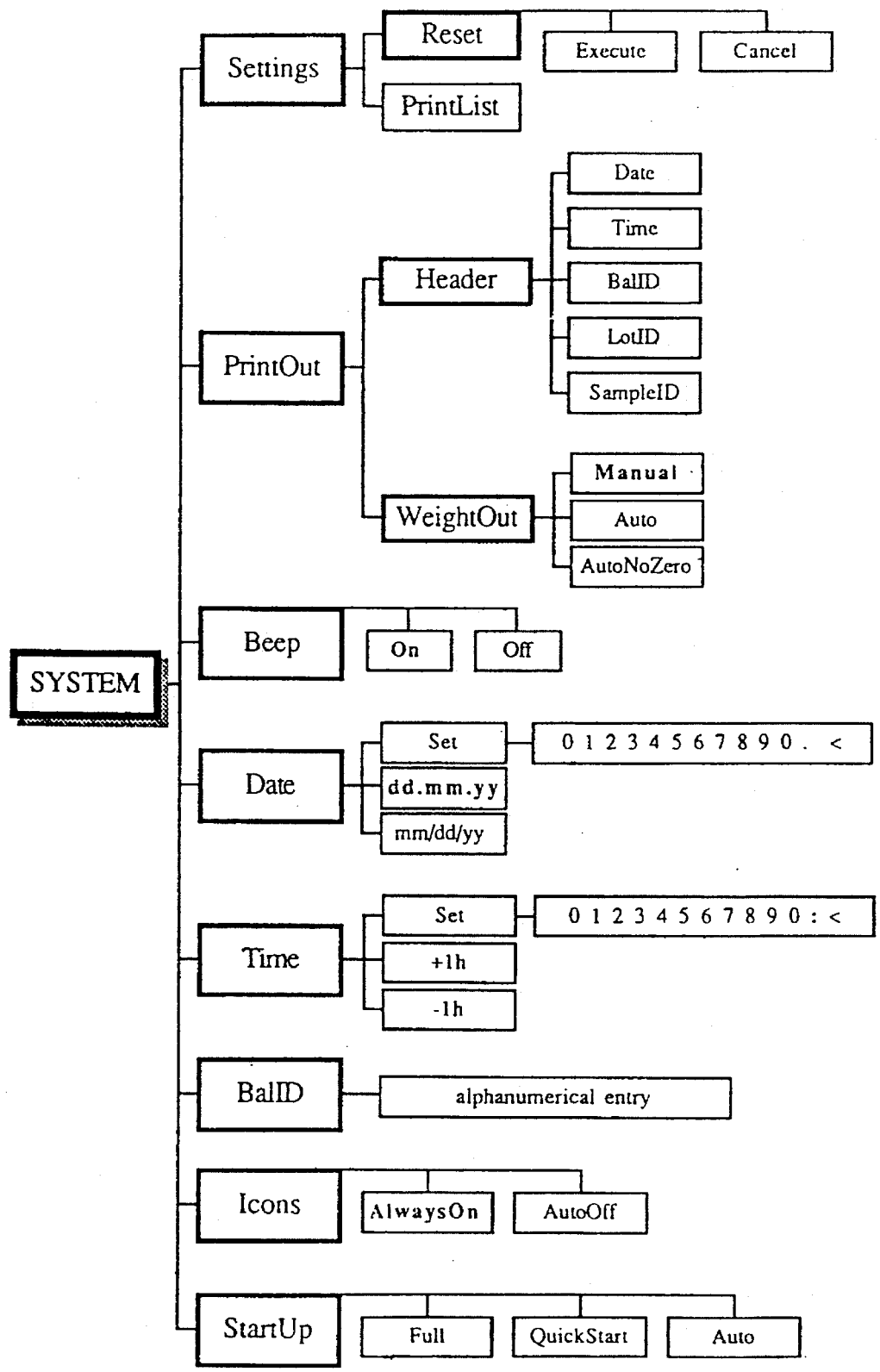
FIG. 9 is a block diagram of the SYSTEM mode of the invention.

The scale electronics will interpret a touching of key 11 directly below SYSTEM in the main menu as the command to have the SYSTEM menu part show up next in display field 13. FIG. 9 illustrates the entire SYSTEM tree. The particular callable levels within the SYSTEM Mode are illustrated schematically in that tree. This figure replaces the individual display modes such as illustrated in FIGS. 1 to 7 for application (APPL). The functions that are possible in the SYSTEM basic operation again are arranged next to each other and directly over key 11 in display field 13 and can be caused to appear by activating the key, that is to say, by touching it below the desired function. After the marking, for example, of DATE comes the display of the subfunctions of the DATE functions in display field 13. Next, within these functions, for example, one can call up the SET function and its subfunctions can be displayed. In display field 13, then once again, arranged next to each other, we get the numbers "1 2 3 4 5 6 7 8 9 0: <" as well as punctuation and the like, which can be assembled into a datum.

By activating the ENTER key, one can store the value that was put in and the superordinate functions SET, dd.mm.yy and mm.dd.yy will now appear in display field 13. The particular superordinate menu will appear every time the ENTER key is tapped again. One can then jump directly into the main menu by working the PRINTINGCOMMAND key.

EXAMPLE 3

The scale electronics will interpret the additional touching of key 11 in the SYSTEM mode directly underneath STARTUP as a command to have the STARTUP menu point next appear in display field 13 (FIG. 9). The functions (FULL, QUICK-START, AUTO) that are possible in the STARTUP basic operation are again set up next to each other and directly over the key 11, illustrated in display field 13, can be selected by activating the key, that is to say, by touching it below the desired function. Considerably more space is available on the key in the X-direction for the selection of these functions than would be available in the preceding example, because only three alternatives are displayed.

After the marking of FULL and activation with the ENTER key, the FULL mode is activated. A hook or a contrast illustration will optically show the selected mode after the key has been touched.

In the scale electronics, the usual STARTUP course is activated after the tare key has been touched in the STANDBY mode, that is to say, lamp test, model name, display "0.00 g." The operator thus can perform the predetermined optical checks (which are specific for the particular scale) before the first weighing operation is performed. This "manual" Startup is state of the art.

By means of the marking QUICKSTART and confirmation with the help of the ENTER key, one can activate modified Startup. With its help, one can start the scale up without any prior lamp test, indication of model name, etc. By activating the TARE key or by putting on a weight with a predeterminable minimum value, the display of the positioned weight value will appear directly in the selected unit of weight.

The third possibility is to activate the "AUTO" mode. The latter facilitates the fully-automatic Startup of the scale that is triggered after a power interruption.

After the selection of FULL, QUICKSTART, or AUTO, one can return into the MENU with the help of the ENTER key.

The ENTER key and the key for the PRINTINGCOMMAND, as said before, can also be made as section of key 11 that is made as a softkey key; but they can also be arranged below display field 13 or next to it as separate, independent keys and they can be labeled [lettered] directly. The user cannot necessarily distinguish these variations from the outside if a correspondingly designed cover masks the key section.

During weighing, using the configured weighing mode, working key 11, that is to say, touching it, one can select the functions listed over the touch point in display field 13, that is to say, such functions as adding, storing the weighing result, etc. Tare key 7, which preferably is also made as a softkey, may—in addition to the function as TARE—also be configured over the entire length, furthermore and additionally for the functions of opening and closing a windshield, ON/OFF, etc.

In addition to the settings described, one can also display the DATE and/or CLOCK TIME in a HEADER within the SYSTEM mode. In the HEADER, along with the time and the date, one can also display additional data that are critical to the weighing operation and—if desired—they can be printed out if a corresponding printer is available.

What is claimed is:

1. Weighing apparatus comprising:

(a) a scale housing (1) including load responsive means (17);

(b) means (30) for producing a digital weight signal as a function of a load applied to said load-responsive means;

(c) digital signal processing means (50) for processing the digital weight signal in accordance with selected ones of a plurality of weighing parameters stored in a memory to produce a desired result;

(d) display means (13,15) controlled by the digital signal processing means for displaying:

(1) selected ones of the plurality of weighing parameters, and (2) said desired result; and (e) variable keyboard means including:

(1) a first tare bar key (7) for taring said digital weight signal producing means and said display means; and (2) a second parameter bar key (11) for selecting weighing parameters and programs indicated in said display, said second bar key including a plurality of variable switching portions of variable length longitudinally of said parameter bar key, resectively.

2. Apparatus as defined in claim 1, wherein said second bar key variable switching portions correspond with a plurality of displayed weighing parameters and programs, respectively; and further wherein said display means includes a generally rectangular display field (13) extending adjacent and parallel with said second bar key for displaying said parameters and programs.

3. Apparatus as defined in claim 2, wherein said second bar key variable switching positions lie adjacent said display field at positions corresponding with the positions of the parameters and program indications longitudinally of said display field, respectively.

4. The method of weighing a load, which comprises the steps of:

(a) providing a plurality of weighing parameters and programs and a plurality of parameter configurations in the memory of a weighing scale; and (b) selecting the weighing parameters and programs and the parameter configurations by operating respective switching portions longitudinally of a bar key (13) arranged adjacent the display means of the weighing apparatus, said bar key switching portions having variable lengths and being operable in accordance with computer operations indicated on said display means adjacent said switching portions of said bar key.

5. The method as defined in claim 4, wherein said parameters and programs are indicated on the display directly above corresponding portions of the bar key; and further including the steps of:

(c) operating the key to display the suboperations associated with the selected weighing program; and (d) operating the key to display and select desired parameters.

* * * * *